Patented Mar. 23, 1954

2,673,202

UNITED STATES PATENT OFFICE 2,673,202

METHOD FOR THE MANUFACTURE OF HIGH ACETYL CELLULOSE ACETATE

Carlton L. Crane, Rochester, N. Y., assignor to Eastman Kodak Company, Rochester, N. Y., a corporation of New Jersey No Drawing. Application November 14, 1951, Serial No. 256,367

4 Claims. (Cl. 260—227)

This invention relates to the manufacture of cellulose acetate having an acetyl content of at least 44.4% achieved by controlling the catalyst and anhydride concentration in the esterification reaction.

Numerous disclosures are found in the prior art relating to the preparation of cellulose triacetate. The term cellulose triacetate as ordinarily employed, however, in referring to cellulose esters, usually is understood to mean esters having an acetyl content above 42.5%. Ordinarily, commercial cellulose triacetate has an acetyl content within the range of 42.7–43.7% acetyl.

Attempts have been made to prepare cellulose acetates having greater than 44% acetyl, and the prior art teaches that there are at least two such methods as follows:

1. The esterification of the cellulose in a bath containing a non-solvent and using perchloric acid as the catalyst, and
2. The preparation of the cellulose triacetate from an alkali metal cellulosate and acetyl chloride. This latter method results in a product containing considerable amounts of impurities which cause discoloration of the products prepared therefrom.

Statements are found in the prior art that it is not possible to make cellulose acetate by a solution method of esterification with an acetyl content much greater than 43.7% acetyl, and that if a true high acetyl ester is required it must be prepared by a non-solvent method.

One object of my invention is to provide a method for preparing cellulose acetates having an acetyl content of at least 44.4% by a solution method. Another object of my invention is to provide a method of making high acetyl cellulose acetate in which it is possible to obtain products having sufficient viscosities to give sheeting or film of good characteristics. A further object of my invention is to provide a method for preparing high acetyl cellulose acetates in which the proportions of the various constituents are so adjusted that a product is obtained having both high acetyl content and good physical properties. A still further object of my invention is to provide a method of preparing cellulose acetates having excellent dielectric properties making those esters useful for electrical insulation purposes. Other objects of my invention will appear herein.

I have found that if cellulose is acetylated under certain controlled conditions, high acetyl cellulose acetates are obtained. The esterification is carried out by controlling the proportion of sulfuric acid catalyst, the anhydride ratio and the liquid to solid ratio in the esterification reaction within such limits that the desired product as described above results. The esterification in accordance with my invention is carried out by employing sulfuric acid catalyst in a proportion of 0.2–2% and preferably .2–1.75%, based on the weight of the cellulose. The proportion of acetic anhydride which is employed is 3–6 parts of anhydride to 1 part of cellulose, the proportion of anhydride being based on the amount of 100% anhydride which is present after the moisture in the bath has all been destroyed. The proportion of anhydride which is employed is such as to insure a content of at least 10% of the anhydride in the esterification bath at the completion of the esterification. The liquid to solid ratio which is employed in the esterification ranges from 8:1 to 15:1, and in order to assure the 10% anhydride referred to it is desirable that the anhydride to cellulose ratio be in considerable amount as the liquid: solid ratio is increased. As is well known, it requires approximately 1.9 parts of 100% acetic anhydride to completely acetylate one part of cellulose. When 3 parts of 100% anhydride are employed (besides that used up in destroying any water present), this leaves only 1.1 parts of anhydride in the bath, and consequently in that case there must not be more than 11 parts of liquid in the completed esterification mass for the anhydride to be at least 10% thereof in accordance with my invention. If, on the other hand, a greater proportion of anhydride is employed, a higher liquid to solid ratio may be used.

In carrying out esterification processes in accordance with my invention, the maximum temperature which is employed is within the range of 90–200° F. in order to give a cellulose ester having the most desirable properties. With the lowest liquid to solid ratio specified, it is desirable that a maximum temperature somewhat above the lower limit set be used, whereas with an increase in this ratio the temperature may be somewhat lower and still give a good product. Also, in using low sulfuric acid ratios, such as near 0.2%, it is desirable in carrying out the esterification in accordance with my invention that somewhat higher temperatures be employed than need be used when higher proportions of sulfuric acid are employed.

After the cellulose esterification has taken place, the ester which is obtained is in solution in the esterification mass. I have found that this cellulose ester is conveniently separated from the liquid mass by adding thereto an aqueous fluid which brings the mass substantially to the glacial point, but not to a point substantially beyond, while at the same time raising the temperature of the mass to 140–190° F., and neutralizing the sulfuric acid which is present therein, followed by precipitating the cellulose ester in hot water such as at 180–212° F. The details of a method of precipitating high acetyl cellulose acetate, which has been found to be excellent for separating the cellulose ester from the esterification mass of my invention, is found in my U. S. Patent No. 2,596,656, granted May 13, 1952.

The preparation of high acetyl cellulose esters in accordance with my invention is most conveniently carried out by first subjecting the cellulose to a pretreatment to facilitate the acetylation thereof. For instance, the cellulose may be presoaked with acetic acid, as is well known in the art. As the activating of cellulose to prepare it for esterification has been described in considerable detail in the prior art, any discussion thereof is believed to be unnecessary. Any pretreatment method which can be adapted to the process as described herein may be employed in preparing cellulose esters in accordance with my invention.

The esterification of the cellulose is carried out in a bath in which the amount of anhydride employed imparts a content of 3–6 parts of 100% acetic anhydride per part of cellulose after the water has all been destroyed. As moisture is present in the cellulose and might also be present in the pretreatment liquid, anhydride is added both to take care of that water and to supply the 3–6 parts thereof referred to. The ratio of anhydride to cellulose which is employed should be such as to insure a content of at least 10% acetic anhydride in the esterification liquid at the completion of the esterification process. As 1.9 parts of 100% acetic anhydride are necessary to esterify 1 part of cellulose, it is apparent that the ratio of 100% anhydride to cellulose which is used would be governed to some extent by the liquid to solid ratio which is employed in the esterification. The liquid to solid ratio in the esterification mass should range from 8:1 to 15:1. If a liquid to solid ratio of 15:1 is employed it may be seen that a ratio of 100% anhydride to cellulose of 3:1 would not be sufficient to insure at least 10% anhydride in the bath at the completion of the esterification. Therefore, with liquid to solid ratios in the upper part of the range given, it would be necessary in accordance with my invention to employ an amount of anhydride more than the minimum designated. It is apparent that determination of the amount of anhydride which should be used with a given liquid to solid ratio to assure at least 10% anhydride in the bath after the esterification is a matter of calculation.

In carrying out the preparation of high acetyl cellulose acetates in accordance with my invention it is desirable that the maximum temperature attained should be within the range of 90–200° F. for good results. The desired temperature may be selected by the individual operator, but it may be stated as a general rule that with the lowest liquid to solid ratios, higher minimum temperatures are more desirable, while with the increase of this ratio, lower temperatures may be employed. For instance, with a liquid to solid ratio of 8:1, it would be desirable to have a minimum temperature of at least 120° F. for the reaction to proceed at a practical rate. Also, with the use of a proportion of sulfuric acid catalyst at the minimum designated, it would be desirable to employ higher temperatures than the lowest which have been indicated as being permissible.

The proportion of sulfuric acid catalyst which is employed is within the range of 0.2–2%, based on the weight of the cellulose, and generally it is preferred that a proportion of sulfuric acid within the range of 0.2–1.75% be used. In order to restrict the temperature to the desired maximum during the course of the esterification, it has been found convenient to add the catalyst to the mass and reduce the temperature thereof prior to the addition of the acetic anhydride so that the heat from the esterification does not reach an excessive temperature. However, in carrying out my invention, any of the commonly recognized methods of controlling the esterification temperature may be used, providing the features which I have indicated as critical are observed in carrying out the reaction. The method of preparing high acetyl cellulose acetates in accordance with my invention makes possible the preparation of products having sufficient viscosities to give good films upon coating out from solvents. Ordinarily, the esters prepared in accordance with my invention will have a viscosity of at least 1,000 centipoises in methylene chloride-methyl alcohol (9:1), unless the operator is interested in preparing esters having low viscosities, in which case more severe reaction conditions may be employed.

After the acetylation has been completed in accordance with my invention, the cellulose acetate obtained is conveniently separated from the mass by adding thereto moisture so as to bring the mass approximately to the glacial point while raising the temperature of the mass to 140–190° F. If the temperature of the mass is already within that range, the moisture is added while in hot condition so that cooling of the mass does not take place. If the mass is below that temperature range, the moisture may be added in the form of steam or hot aqueous acetic acid, or the mass may be heated at the same time that the water is being added thereto. Also, the sulfuric acid in the mass is neutralized while the mass is at the 140–190° temperature. The cellulose acetate is then precipitated by adding water to the mass, which water has a temperature of 180–212° F. In this way a product is obtained which, when dried, is readily susceptible to the action of solvents or washing fluids or any other treatment which is desired.

The esters in accordance with my invention are especially useful where a high resistance to effects of moisture is desired. For instance, if these esters are employed for the making of base for photographic film, the resulting product is free of any warping or distortion which might be caused by moisture. Esters prepared in accordance with my invention are also useful for electrical insulation purposes or for preparing filaments in which a high degree of moisture resistance is desired. The cellulose acetates prepared in accordance with my invention have an acetyl content of at least 44.4%.

The following examples illustrate my invention:

*Example 1*

308 parts of refined cotton linters consisting of 300 parts of cellulose and 8 parts of water were placed in a sigma-bladed mixer together with a mixture of 1200 parts of acetic acid and 1 part of distilled water. The mixer was run 30 minutes to a maximum temperature of 100° F. 281 parts of acetic acid was added to the mixer, and the temperature thereof was cooled to 90° F. There was then added to the mixer a mixture of .697 part of sulfuric acid (93.8%) and 50 parts of acetic acid, and the temperature was reduced to 66° F. while the mixing was continued. 1220 parts of 97% acetic anhydride having a temperature of 19° F. was added to the mixer. The reaction temperature was allowed to rise to a maximum of 123° F. over a period of 3 hours. When the reaction was complete, a mixture consisting of 105 parts of distilled water and 3950 parts of acetic acid having a temperature of 180–190° F. was added to the mixer over a period of 15 minutes. During this addition the inside temperature of the mixer rose to a maximum of 176° F. While at this temperature, 0.65 part of magnesium carbonate (91% pure) was added to the mass, followed by the addition of sufficient glacial acetic acid to assure good fluidity thereof. The solution was precipitated by pouring it into distilled water having a temperature of 180–190° F. The product was washed in 15 two-hour changes of distilled water and dried at 140° F.

In the above esterification the liquid to solid ratio was 9.2:1, and the acetic anhydride present therein at the end of the esterification was 22.3% of the total liquid in the mass. The product obtained analyzed as follows:

| | |
|---|---|
| Acetyl content _____ per cent__ | 44.6 |
| Intrinsic viscosity in formic acid _____ | 2.73 |
| Viscosity at 25° C. of its 10% solution in methylene chloride-methyl alcohol (9:1) _____ cps__ | 3954 |
| Char point _____ ° C__ | 300 |
| Sulfur content _____ per cent__ | 0.002 |

*Example 2*

307 parts of refined cotton linters having a moisture content of 2.3% were placed in a sigma-bladed mixer together with a mixture of 1100 parts of acetic acid and 2 parts of distilled water. The mixer was run for 30 minutes, bringing the temperature of the mass to 104° F. Thereupon a mixture of 1.393 parts of sulfuric acid (93.7%) and 50 parts of acetic acid was added to the mixer and the temperature was reduced to 60° F., the stirring being continued. 1240 parts of 95.7% acetic anhydride was then added to the mixer and the temperature of the mass was allowed to rise to 138° F. over 2¾ hours. After the cellulose had completely dissolved in the esterification bath, a mixture consisting of 100.7 parts of distilled water and 399.3 parts of acetic acid was added to the mixer over 30 minutes. The temperature of the mass rose to 152° during this addition. 1.33 parts of magnesium carbonate was then stirred into the reaction solution for 15 minutes.

The solution of the cellulose acetate was then precipitated by pouring it into boiling distilled water, and the resulting product was washed in 15 two-hour changes of distilled water, and was then dried at 140° F.

In the above procedure the liquid to solid ratio was 8:1, and the acetic anhydride in the bath at the end of the esterification was 26.1%. Analysis of the product indicated the following:

| | |
|---|---|
| Acetyl content _____ per cent__ | 44.7 |
| Intrinsic viscosity in formic acid _____ | 2.31 |
| Viscosity at 25° C. of a 10% solution in methylene chloride-methyl alcohol (9:1) _____ cps__ | 1746 |
| Heat stability by heating 8 hours at 180° C__ | 14 |

*Example 3*

306 parts of refined cotton linters having a moisture content of 2% were placed in a sigma-bladed mixer together with 3 parts of distilled water and 1200 parts of acetic acid, and the mass was mixed for 30 minutes, bringing to a maximum temperature of 103° F. A mixture of 3.12 parts of sulfuric acid (93.7%) and 50 parts of acetic acid was added to the mixer and the mass was cooled to 66° F. 930 parts of 97% acetic anhydride were added to the mixer and the temperature then was reduced to 50° F. 2.7 parts of 93.7% sulfuric acid was mixed with 571 parts of acetic acid, and the mixture was added to the reaction bath. The temperature of the mass was allowed to rise to 90° F. over 1½ hours. When the reaction was complete (2½ hours), a mixture of 500 parts of a mixture of distilled water and acetic acid (1:9) was added to the mixer over 30 minutes. 5.3 parts of magnesium carbonate was then added to the reaction solution and the solution was stirred for 15 minutes. The temperature of the mass rose to 133° F. during this time. 1750 parts of the mass was diluted with acetic acid so as to impart good fluidity thereto, and the mass was then precipitated into the boiling distilled water. The precipitate was thoroughly washed in distilled water and dried at 140° F. In this procedure the liquid to solid ratio used was 9.2:1 and the acetic anhydride in the bath at the end of the esterification was 11.21%, based on the liquid of the bath. The product obtained analyzed as follows:

| | |
|---|---|
| Acetyl content _____ per cent__ | 44.6 |
| Intrinsic viscosity in formic acid _____ | 3.0 |
| Viscosity at 25° C. of a 10% solution in methylene chloride-methyl alcohol (9:1) _____ cps__ | 8669 |
| Sulfur content _____ per cent__ | 0.006 |
| Heat stability by heating 8 hours at 180° C_ | 12 |

I claim:

1. A method of preparing cellulose acetate having an acetyl content of at least 44.4%, which comprises esterifying cellulose at a temperature not exceeding 90–200° F. with an esterification bath essentially consisting of acetic anhydride, acetic acid and a sulfuric acid catalyst, the bath containing sufficient acetic anhydride to supply 3–6 parts thereof per part of cellulose, and to assure at least 10% of acetic anhydride in the bath at the end of the esterification, the sulfuric acid catalyst being present in a proportion of 0.2–2%, based on the weight of the cellulose, and the ratio of esterification bath to catalyst in the esterification being within the range of 8:1 to 15:1, and when the esterification is completed adding water to the mass to bring it to, but not substantially beyond, the glacial point, while raising the temperature thereof to 140–190° F. and neutralizing the sulfuric acid therein, followed by precipitation of the cellulose ester in water having a temperature of 180–212° F.

2. A method of preparing cellulose acetate having an acetyl content of at least 44.4% which comprises esterifying cellulose at a temperature not exceeding 90–200° F. with an esterification bath essentially consisting of acetic anhydride, acetic acid and a sulfuric acid catalyst, the bath containing sufficient acetic anhydride to supply 3–6 parts thereof per part of cellulose and to assure at least 10% of acetic anhydride in the bath at the end of the esterification, the sulfuric acid catalyst being present in a proportion of 0.2–2%, based on the weight of the cellulose and the ratio of esterification bath to catalyst in the esterification being within the range of 8:1 to 15:1, and when the esterification is completed, adding water to the mass to bring it to, but not substantially beyond, the glacial point while raising the temperature thereof to 140–190° F., and neutralizing the sulfuric acid therein with a basic magnesium compound followed by precipitation of the cellulose ester in water having a temperature of 180–212° F.

3. A method of preparing cellulose acetate having an acetyl content of at least 44.4% which comprises esterifying cellulose at a temperature not exceeding 90–200° F. with an esterification bath essentially consisting of acetic anhydride, acetic acid and a sulfuric acid catalyst, the bath containing sufficient acetic anhydride to supply 3–6 parts thereof per part of cellulose and to assure at least 10% of acetic anhydride in the bath at the end of the esterification, the sulfuric acid catalyst being present in a proportion of 0.2–2%, based on the weight of the cellulose, and the ratio of esterification bath to catalyst in the esterification being within the range of 8:1 to 15:1, and when the esterification is completed, adding water to the mass to bring it to, but not substantially beyond, the glacial point while raising the temperature thereof to 140–190° F., and neutralizing the sulfuric acid therein with magnesium carbonate followed by precipitation of the cellulose ester in water having a temperature of 180–212° F.

4. A method of preparing cellulose acetate having an acetyl content of at least 44.4% which comprises esterifying cellulose at a temperature not exceeding 90–200° F. with an esterification bath essentially consisting of acetic anhydride, acetic acid and a sulfuric acid catalyst, the bath containing sufficient acetic anhydride to supply 3–6 parts thereof per part of cellulose and to assure at least 10% of acetic anhydride in the bath at the end of the esterification, the sulfuric acid being present in a proportion of 0.2–2%, based on the weight of the cellulose, and the ratio of esterification bath to catalyst in the esterification being within the range of 8:1 to 15:1, and when the esterification is completed, adding water to the mass to bring it to, but not substantially beyond, the glacial point while raising the temperature thereof to 140–190° F. and neutralizing the sulfuric acid therein, followed by precipitation of the cellulose ester in boiling water.

CARLTON L. CRANE.

References Cited in the file of this patent

UNITED STATES PATENTS

| Number | Name | Date |
|---|---|---|
| 1,041,587 | Borzykowski | Oct. 15, 1912 |
| 1,862,589 | Dreyfus | June 14, 1932 |
| 2,000,428 | Walker | May 7, 1935 |
| 2,317,767 | Hofmann et al. | Apr. 27, 1945 |
| 2,426,982 | Clark et al. | Sept. 9, 1947 |
| 2,596,656 | Crane | May 13, 1952 |